US009558738B2

United States Patent
Bocchieri et al.

(10) Patent No.: US 9,558,738 B2
(45) Date of Patent: Jan. 31, 2017

(54) SYSTEM AND METHOD FOR SPEECH RECOGNITION MODELING FOR MOBILE VOICE SEARCH

(75) Inventors: Enrico Bocchieri, Chatham, NJ (US); Diamantino Antonio Caseiro, Philadelphia, PA (US); Dimitrios Dimitriadis, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 729 days.

(21) Appl. No.: 13/042,671

(22) Filed: Mar. 8, 2011

(65) Prior Publication Data

US 2012/0232902 A1 Sep. 13, 2012

(51) Int. Cl.
*G10L 15/00* (2013.01)
*G10L 15/06* (2013.01)
*G10L 15/14* (2006.01)

(52) U.S. Cl.
CPC .............. *G10L 15/063* (2013.01); *G10L 15/14* (2013.01)

(58) Field of Classification Search
CPC ........ G10L 15/00; G10L 15/06; G10L 15/063; G10L 15/065; G10L 15/07; G10L 15/075; G10L 15/08; G10L 15/10; G10L 15/14; G10L 15/142; G10L 15/146; G10L 15/187; G10L 2015/00; G10L 2015/06; G10L 2015/063; G10L 2015/0631; G10L 2015/0633; G10L 2015/0635; G10L 2015/0636; G10L 2015/0638
USPC ................ 704/207, 231, 243, 251, 256, 246
See application file for complete search history.

(56) References Cited

U.S. PATENT DOCUMENTS

| | | | | |
|---|---|---|---|---|
| 5,953,701 | A * | 9/1999 | Neti et al. | 704/254 |
| 6,317,712 | B1 * | 11/2001 | Kao et al. | 704/256.3 |
| 6,999,925 | B2 * | 2/2006 | Fischer et al. | 704/243 |
| 7,684,988 | B2 * | 3/2010 | Barquilla | 704/256.1 |
| 7,805,301 | B2 | 9/2010 | Tian et al. | |
| 8,280,726 | B2 * | 10/2012 | Mao et al. | 704/207 |
| 8,442,832 | B2 * | 5/2013 | Jung et al. | 704/270 |

(Continued)

FOREIGN PATENT DOCUMENTS

EP 1845699 10/2007

OTHER PUBLICATIONS

K. Beulen; H. Ney Automatic Question Generation for Decision Tree Based State Tying, 1998, Proceedings of the IEEE Conference on Acoustics, Speech and Signal Processing, 805-809.*

(Continued)

*Primary Examiner* — Paras D Shah

(57) ABSTRACT

Disclosed herein are systems, methods, and non-transitory computer-readable storage media for generating an acoustic model for use in speech recognition. A system configured to practice the method first receives training data and identifies non-contextual lexical-level features in the training data. Then the system infers sentence-level features from the training data and generates a set of decision trees by node-splitting based on the non-contextual lexical-level features and the sentence-level features. The system decorrelates training vectors, based on the training data, for each decision tree in the set of decision trees to approximate full-covariance Gaussian models, and can train an acoustic model for use in speech recognition based on the training data, the set of decision trees, and the training vectors.

19 Claims, 4 Drawing Sheets

| LM | AM | Front-End | Word acc (%) |
|---|---|---|---|
| r1 | r1 | MFCC | 66.4 |
| r2 | r2 | MFCC | 71.6 |
| r3 | r3 | MFCC | 75.4 |
| r4 | r4 | MFCC | 77.1 |
| r4 | i,ii | MFCC | 77.6 |
| r4 | i,ii5ph | MFCC | 77.8 |
| r4 | i,ii,iii$_F$ | MFCC | 77.9 |
| SL | i,ii,iii$_F$ | MFCC | 78.3 |
| SL | i,ii,iii$_S$ | MFCC | 78.9 |
| SL | i,ii,iii$_F$ | TECC | 79.0 |
| SL | i,ii,iii$_S$ | TECC | 79.7 |

(56) References Cited

U.S. PATENT DOCUMENTS

| | | | |
|---|---|---|---|
| 2006/0074656 A1* | 4/2006 | Mathias | G10L 15/063 704/243 |
| 2007/0033042 A1 | 2/2007 | Marcheret et al. | |
| 2009/0171662 A1 | 7/2009 | Huang et al. | |
| 2010/0121638 A1* | 5/2010 | Pinson et al. | 704/235 |
| 2011/0218804 A1* | 9/2011 | Chun | 704/243 |

OTHER PUBLICATIONS

W. Reichl;Wu Chou, A unified approach of incorporating general features in decision tree based acoustic modeling, 1999, ICASSP '99 Proceedings of the Acoustics, Speech, and Signal Processing, 1999. on 1999 IEEE International Conference, vol. 02, pp. 573-576.*

George Tzanetakis, Audio-Based Gender Identification Using Bootstrapping, 2005, IEEE, pp. 432-433.*

Ye Tian;Jian-lai Zhou;Hui Lin;Hui Jiang, Tree-Based Covariance Modeling of Hidden Markov Models, 2006, IEEE, vol. 14 No. 6, pp. 2134-2146.*

Min Tang;Stephanie Seneff;Victor W. Zue, Modeling Linguistic Features in Speech Recognition, 2003, Eurospeech 2003, pp. 2585-2588.*

Dimitriadis, Dimitrios, Petros Maragos, and Alexandros Potamianos. "Auditory Teager energy cepstrum coefficients for robust speech recognition." Proc of Interspeech. 2005.*

Shafran, I.; Ostendorf, M., "Use of higher level linguistic structure in acoustic modeling for speech recognition," Acoustics, Speech, and Signal Processing, 2000. ICASSP '00. Proceedings. 2000 IEEE International Conference on , vol. 2, No., pp. II1021,II1024 vol. 2, 2000.*

Banerjee, Pratyush, et al. "Application of triphone clustering in acoustic modeling for continuous speech recognition in Bengali." Pattern Recognition, 2008. ICPR 2008. 19th International Conference on. IEEE, 2008.*

Tzanetakis, George, and M. Chen. "Building audio classifiers for broadcast news retrieval." Proc. of WIAMIS. vol. 4. 2004.*

Ananthakrishnan, Sankaranarayanan, and Shrikanth Narayanan. "Unsupervised adaptation of categorical prosody models for prosody labeling and speech recognition." Audio, Speech, and Language Processing, IEEE Transactions on 17.1 (2009): 138-149.*

Ogawa, A., K. Takeda, and F. Itakura. "Language Modeling for robust balancing of acoustic and linguistic probabilities." Automatic Speech Recognition and Understanding, 1997. Proceedings., 1997 IEEE Workshop on. IEEE, 1997.*

Chen, Stanley F., and Ronald Rosenfeld. "Efficient sampling and feature selection in whole sentence maximum entropy language models." Acoustics, Speech, and Signal Processing, 1999. Proceedings., 1999 IEEE International Conference on. vol. 1. IEEE, 1999.*

Xiao, Jinghui, Bingquan Liu, and Xiaolong Wang. "An Empirical Study of Non-Stationary Ngram Model and its Smoothing Techniques." Computational Linguistics and Chinese Language Processing 12.2 (2007): 127-154.*

Marino, José B., et al. "The TALP ngram-based SMT system for IWSLT 2007." (2007).*

Heintz, Ilana. Arabic language modeling with stem-derived morphemes for automatic speech recognition. Diss. The Ohio State University, 2010.*

Chan van Heerden et.al., "Exploring Language modeling alternatives with goog-411," Proc. of Interspeech 2009.

A.Acero et.al., "Live Search for mobile: we services by voice on the cellphone," Microsoft Corporation, One Microsoft Way, Redmond, WA 98052, Proc. of ICASSP, pp. 5256-5259, 2008.

V.Goffin et al., "The AT&T Watson speech recognizer," Proc. of ICASSP, 2005.

S.J. Young et al , "Tree-based state tying for high accuracy acoustic modelling," Cambridge University Engineering Department, Trumpington Street, Cambridge, CB2 1PZ, England, Proc. of H.L. T., pp. 307-312, 1994.

D.Rybach et al. "Direct construction of compact context-dependency transducers from data," Proc. of Interspeech, pp. 218-221, 2010.

D.B. Paul, "Extensions to phone-state decision-tree clustering: singie tree and tagged clustering," Proc. of ICASSP, pp. 1487-1490 vol. 2, 1997.

H.Liao et al., "Decision tree state dustering with word and syllable features," Google Research, New York, NY, USA, Proc. of Interspeech, 2010.

C.Fugen et al. "Integrating dynamic speech modalities into context decision trees," Interactive Systems Labs, University of Karlsruhe, Germany, Proc. of ICASSP, 2000.

K.Beulen et al. "Automatic question generation for decision tree based state tying," Lehrstuhl fur Informatik VI, TWTH Aachen, University of Technology, D-52056 Aachen, Proc. of ICASSP, 1998.

D. Dimitriadis et al., "An Alternative Front-End for the AT&T Watson LV-CSR System," submitted in Proc. of ICASSP-11, 2011.

D. Dimitriadis et al., "On the Effects of Filterbank Design and Energy Computation on Robust Speech Recognition," accepted in Trans. on Audio, Speech and Language Processing, 2010.

Charl van Heerden et.al., "Language modeling for What-with-Where on GOOG-411," Proc. of Interspeech, 2009.

Foote, Jonathan Trumbull, "Decision-Tree Probability Modeling for HMM Speech Recognition", Thesis Submitted in partial fulfillment of the requirements for the Degree of Doctor of Philisophy in the Division of Engineering at Brown University, May 1994.

* cited by examiner

FIG. 4

| LM | AM | Front-End | Word acc (%) |
|---|---|---|---|
| *r1* | *r1* | *MFCC* | 66.4 |
| *r2* | *r2* | *MFCC* | 71.6 |
| *r3* | *r3* | *MFCC* | 75.4 |
| *r4* | *r4* | *MFCC* | 77.1 |
| *r4* | *i,ii* | *MFCC* | 77.6 |
| *r4* | *i,ii5ph* | *MFCC* | 77.8 |
| *r4* | *i,ii,iii$_F$* | *MFCC* | 77.9 |
| *SL* | *i,ii,iii$_F$* | *MFCC* | 78.3 |
| *SL* | *i,ii,iii$_S$* | *MFCC* | 78.9 |
| *SL* | *i,ii,iii$_F$* | *TECC* | 79.0 |
| *SL* | *i,ii,iii$_S$* | *TECC* | 79.7 |

SYSTEM AND METHOD FOR SPEECH RECOGNITION MODELING FOR MOBILE VOICE SEARCH

BACKGROUND

1. Technical Field

The present disclosure relates to automatic speech recognition (ASR) and more specifically to adapting and training acoustic models and language models for ASR on mobile devices.

2. Introduction

Several applications of voice-search for business listings have recently been developed for cell-phones. Speak4it, developed at AT&T for the Apple iPhone® and available from the Apple App store, is one example of a client-server speech based application. In Speak4it and other representative applications, a user can freely pronounce in one turn the description, and optionally location, of the desired business, to access the business information presented on the phone display as a map with hypertext links. This type of application provides a useful natural language service to mobile device users, but relies on significant server resources in a network. The efficiency, accuracy, and overall cost of these systems are constant problems, especially as the numbers of mobile device users constantly scales higher and higher.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure describes an advance in automatic speech recognition (ASR) for voice search applications. AT&T's Speak4it app is one real-life example of such a voice search application. The back-end ASR servers can increase the effectiveness of acoustic model (AM) and language model (LM) adaptation and training based on relatively small amounts of application field-data via algorithmic improvements concerning the use of sentence length in LM, of non-contextual features in AM decision-trees, and of the Teager energy in the acoustic front-end. The combination of these algorithms can yield substantial accuracy improvements. LM and AM estimation on field-data samples increases the word accuracy from 66.4% to 77.1%, a relative word error reduction of 32%. The algorithmic improvements increase the accuracy to 79.7%, an additional 11.3% relative error reduction.

Some accuracy and efficiency problems in providing ASR as a service to mobile devices concern improving automatic speech recognition accuracy by better clustering of hidden Markov model (HMM) states by decision-trees. This disclosure improves the clustering of hidden Markov model states performed by decision trees. The improvements discussed herein include simultaneously performing (1) decorrelation of training vectors for every tree, to approximate full-covariance Gaussian models by diagonal covariance models, (2) using non-contextual "lexical" and "sentence-level" features for node-splitting in growing decision-trees, and (3) automatically inferring, from untagged data, "sentence-level" properties that can be used as sentence level features. The approach disclosed herein can provide benefits such as more accurate speech recognition. Further, expensive hand-labeling of data is not required as for "traditional" features like speaker gender and speaker dialect, because this approach infers such features from the data.

Disclosed are systems, methods, and non-transitory computer-readable storage media for generating an acoustic model for use in speech recognition. A system configured to practice the method first receives training data. Then the system identifies non-contextual lexical-level features in the training data and infers sentence-level features from the training data. The system generates a set of decision trees by node-splitting based on the non-contextual lexical-level features and the sentence-level features and decorrelates training vectors, based on the training data, for each decision tree in the set of decision trees to approximate full-covariance Gaussian models. Then the system can train an acoustic model for use in speech recognition based on the training data, the set of decision trees, and the training vectors.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates example word accuracies (asymptotic at large beam-widths) for various system components.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improving ASR as a network-based service. A brief introductory description of a basic general purpose system or computing device in FIG. 1 which can be employed to practice the concepts is disclosed herein. A more detailed description of the various approaches will then follow. The estimation of acoustic models (AM) and language models (LM) on application field-data can assist in achieving high recognition accuracy. Field-data are useful even in relatively small amounts compared to the data for training task-independent models. The disclosure continues to describe an exemplary pilot system for the initial deployment, and the system upgrades and recognition accuracy improvements by the AM and LM estimation on temporal snapshots of field-data. The disclosure continues on to discuss improvements in modeling, concerning a LM conditioned on sentence length, the use of non-contextual features in AM decision trees, and improvements in robustness of the acoustic front-end. A combination of these approaches can significantly improve the recognition accuracy. These variations shall be discussed herein as the various embodiments are set forth. The disclosure now turns to FIG. 1.

Figure 1:
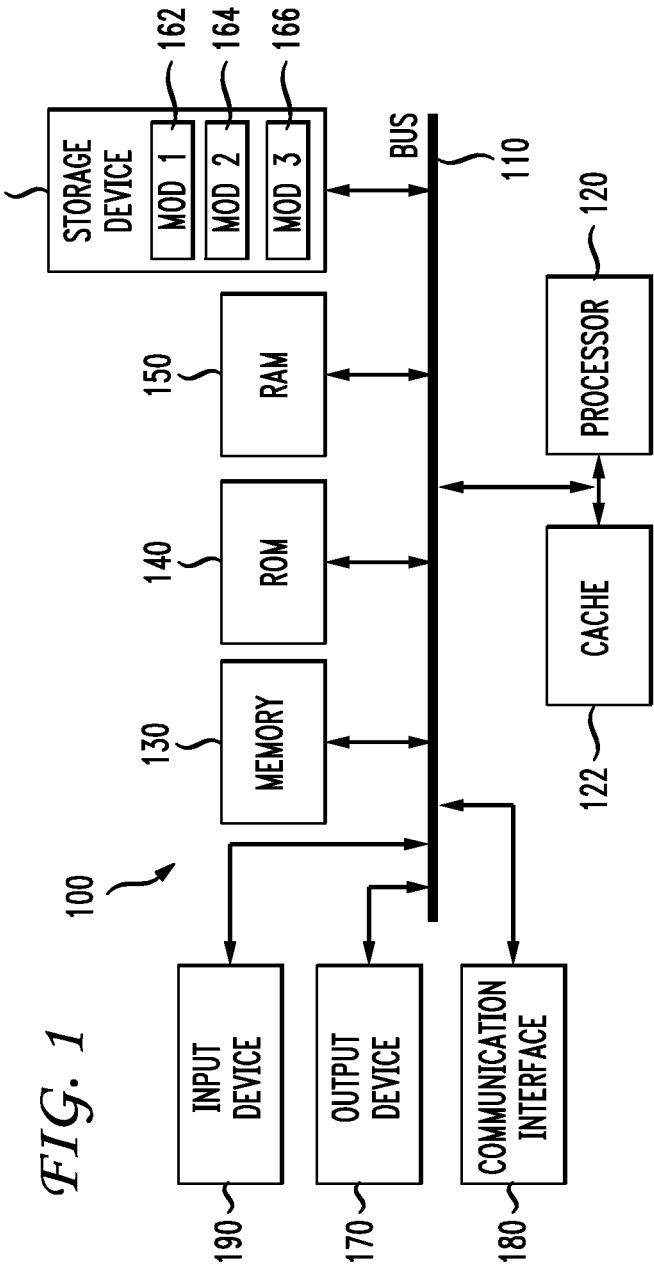
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
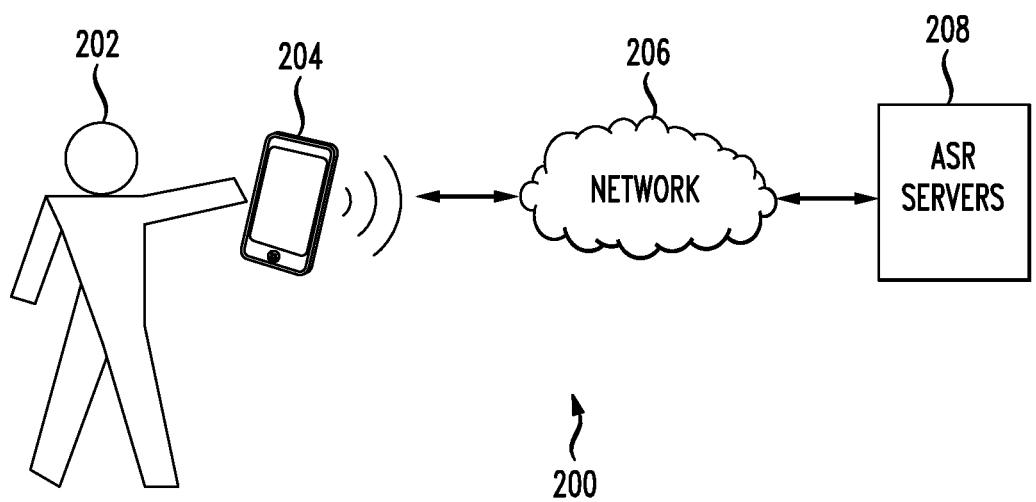
FIG. 2 illustrates an example architecture for a network-based automatic speech recognition service.

Having disclosed some components of a computing system, the disclosure now returns to a discussion of improving automatic speech recognition (ASR). FIG. 2 illustrates a simplified example architecture 200 for providing ASR services for mobile devices. In this architecture 200, a user 202 utters a natural language query or command to a mobile (or non-mobile) device 204. The device 204 communicates the speech received from the user 202 to one or more ASR servers 208 via a network 206, such as the Internet, the public switched telephone network, a cellular telephone network, and/or any other suitable communications network. The ASR servers 208 provide ASR as a service, such as a in a cloud-based computing environment. The ASR servers 208 receive the speech, perform speech recognition on the speech, and return the speech recognition results to the device 204 via the network 206. The device 204 can then integrate the speech recognition results into an application or otherwise use the speech recognition results. The results can be a transcription of the uttered speech, but the results can take other forms. For example, if the speech is a search query, the results can include the recognized search term(s) as well as a listing of search results based on the recognized search term(s).

The principles disclosed herein were tested on a pilot ASR system. Application client prototypes were installed on smartphone units, and testers used the client prototypes to record speech during daily activities. However, due to the lack of geographical and demographic diversity, the data collected from the client prototypes was used mostly as a development set to evaluate the tuning of the pilot recognizer.

The example language model is a Katz back-off 3-gram language model built using 10 million anonymous business search queries from yellowpages.com. These are typed, not spoken, queries consisting of two fields: a search term (e.g. business name) and a location. To approximate the text of spoken queries for LM estimation, these fields were combined in one sentence using the most frequent carrier phrases in the development data, weighted by relative frequency. Misspellings and inconsistent business name tokenizations in the user-typed web queries were corrected by 62 k substitution rules. After text normalization, the vocabulary contains 240 k words.

The example acoustic model, or "general" telephone acoustic model of a recognizer, is a discriminatively trained tri-phone hidden Markov model (HMM), with states consisting of Gaussian mixtures, estimated on 2 k hours of telephone audio data. The acoustic frames have 60 dimensions, defined by discriminative projections of MFCC vectors. To better match the AM to the smartphone recordings, the experiment adapted the AM on 120 hours of wireless speech data from a directory assistance (DA) application, by the maximum a posteriori (MAP) method. The MAP was set to weight the DA data for half of the total count, which optimized the accuracy on the smartphone pilot data.

With respect to deployment and system updates, the word accuracy in the first week of deployment of the pilot recognizer was approximately 65%, or 15% lower than in the pilot study. Real users talk in noisier environments, following different patterns than the "pilot" users. For example the city-state location (relatively easy to recognize correctly) is not specified in 80% of the field-data, and many sentences are not business queries. To improve recognizer performance, a fraction of the recordings from the field was transcribed (high quality transcriptions of approximately 1,000 queries/day, with average 2.5 words/query) for model adaptation and training. This disclosure refers to four different Speak4it recognition systems: r1, pilot LM and AM, no field-data available; r2, LM and AM upgrades based on 30 k spoken queries; r3, LM and AM upgrades based on 158 k spoken queries; and r4, LM and AM upgrades based on 337 k spoken queries.

Turning now to LM adaptation, interpolation can combine several models estimated on the field-data and on the much larger and more general web-data. Interpolation provides free parameters, namely the interpolation weights, that can be estimated by minimizing the LM perplexity of held-out field data. First, the experiment re-estimated the frequency of carrier phrases on the field data and rebuilt the web-queries language model. Then, this model was linearly interpolated with 2 and 3-gram models estimated from the available field transcriptions, and with several models estimated on subsets of field-data and web-data, respectively.

The strategy for selecting data subsets changed as more queries were transcribed. In r2, the web corpus was partitioned in 200 subsets using k-means clustering of td-idf (term frequency—inverse document frequency) weighted term vectors, and the cosine distance. In r3, we divided the field data in weekly data sets. Partitioning the data diminished improvements as the field data increased, so in r4 only the complete web and field data models were used.

For AM adaptation and retraining, the adaptation of the r1 acoustic model on the transcribed field-data sets was performed by two steps: (1) applying Maximum-Likelihood Linear Regression (MLLR) to the Gaussian means, and (2) applying two iterations of supervised segmentation and MAP adaptation of Gaussian means, variances and mixture weights. This process generates several adapted models for different MAP prior values, respectively, and the best model is selected by testing on held-out data. The AM adaptation is automatic, given the speech data and their transcriptions. A text-to-speech system can provide the dictionary entries of the words in the transcriptions. In general, AMs trained on task-specific data yield higher recognition accuracy than AMs adapted on the same data, when sufficient data are available. For the Speak4it task, this corresponds to 110 k (or more) queries.

Thus, the r2 AM is derived by adaptation of the r1 AM (on 30 k queries). Instead, the AMs r3 and r4 are fully trained AMs on 158 k and 337 k queries, respectively. Their sizes are:

r1, r2 AMs: 44 k triphones, 14 k states, 278 k Gaussians.
r3 AM: 14 k triphones, 4.8 k states, 96 k Gaussians.
r4 AM: 19 k triphones, 7.6 k states, 153 k Gaussians.

The r1 and r2 AMs have the size of the generic AM above, from which they derive by adaptation steps. The r3 and r4 AMs are smaller because they are trained on the smaller field-data sets, and their sizes were optimized by experiment.

These approaches bring several accuracy improvements. The accuracies (6,461 queries test-set) of systems r1 through r4 are plotted in FIG. 3 versus the real-time factor (CPU time normalized by the input speech duration). The accuracy curves are obtained by varying the pruning beam-width of the Viterbi decoder. All other computational speed-up techniques, such as Gaussian selection and state histogram pruning, are turned off, because the emphasis here is on ASR accuracy. The asymptotic word accuracies of systems r1 through r4 are also presented in the first four lines of FIG. 4, respectively.

The improvements of r2, r3 and r4 with respect to r1 reflect both the LM and AM upgrades. The respective asymptotic accuracies of r1 and r4 are 66.4% and 77.1%, for a 10.7% absolute word error rate reduction. The relative effectiveness of comparing the LM and AM upgrades can be determined by factors such as the available data, and suitability of the base-line models. When using the largest field-data set, as in r4, upgrading only the AM works better than upgrading only the LM, with accuracies of 72.9% and 70.6%, respectively.

However, the opposite held with fewer field-data, as in r2. The adaptation of both the LM and AM increases the asymptotic word accuracy to 71.6%, while the adaptation of just the LM or AM improved the asymptotic word accuracy to 69.9% and 67.9% respectively. This result is because the r1 LM was highly mismatched, and its adaptation on even the small amount of field data (r2) proved sufficient in learning the statistics of few carrier phrases. However, additional LM adaptation in r3 and r4 provides smaller improvements of accuracy, as very large data are generally needed for the estimation/adaptation of statistical LM's.

The disclosure now discusses various algorithmic improvements of the LM, AM and acoustic front-end. The proposed LM and AM are trained on the r4 field data set, thus the r4 recognizer serves as baseline. In regards to a sentence length conditioned LM, an analysis of the field-data transcriptions demonstrates that about 10% of the input queries are out-of-domain. The user often tries to use speech for unsupported functionalities (e.g. map navigation or voice dialing), or simply plays with the application uttering arbitrary speech. Since these out-of-domain sentences are often longer than in-domain utterances, and clearly correspond to a different user intent, the LM estimation can be conditioned based on sentence length. A 3-gram language model can be used for each of six subsets of the transcribed training data, containing, respectively sentences of length $|s|\leq 3$, $|s|=4$, $|s|=5$, $|s|=6$, $|s|=7$, $|s|\geq 7$. These language models can be linearly interpolated with a 3-gram language model trained on all transcription and with the web query model, by minimizing the perplexity on a development set.

With respect to decision trees for context modeling, a HMM-based ASR system can train context-dependent phonetic HMMs with state observation probability distribution functions conditioned on the phonetic context. To solve data sparsity problems, the phonetic contexts can be clustered by applying decision trees to the training data of the HMM monophone states, a process also known as state tying.

The decision-tree algorithm disclosed below is based on the greedy maximization of the likelihood of Gaussian models with diagonal covariance, exploiting sufficient statistics for computational speed in training In systems r1 through r4, tree-node splitting is based on binary questions on the phonetic context, characterized by the features of place and manner of articulation. Several aspects to improve recognition accuracy include decorrelation of training vectors for every tree to approximate full-covariance Gaussian models, and binary questions about phonetic context expressed as membership to phoneme sets (which can include one or more phoneme).

In experiments on Speak4it, pentaphone AMs show small accuracy improvements over triphones, with longer decoding times. Thus, features other than the phonetic context can be used to improve triphone models. The features can be encoded by adding tags to monophonic labels. Differently tagged monophones share the same decision tree where nodes can be split according to binary properties of both the tags and/or the phonetic context. The phonetic HMMs can be conditioned on meta-information such as "non-native speaker", without forcing the HMM state estimation on sparse subsets of data.

Lexical features, such as word and syllable, are handled by modifications of dictionary entries during AM training and recognition. For example, phoneme /p/ can be tagged with "F" when it is word final. The /p/ and /$p_F$/labels are contained in the sets that define the tree-building contextual questions. The /p/ and /$p_F$/labels share the same decision tree, and tree nodes may be split by the phonetic tag and by phonetic context.

Entire utterances can be labeled with sentence ("S") features that typically refer to classes of speakers (e.g. gender, foreign-accent), or of acoustic environments. Tree building can proceed as with the lexical features, simply by applying the tag to the phonemes of whole utterances. However decoding is different, because the input sentences are not tagged. A sentence classifier, using a one, two, or multiple pass approach, can perform tagging, but the tagging can introduce potentially undesirable latency in real-time applications. Therefore the system can decode the input sentence for the different tag values simultaneously based on the hypothesis with the best score. Beam-search pruning can reduce the time overhead.

We think it is very useful to define features automatically from data, instead of requiring hand-labeling of the training sentences, as needed for gender and dialect). Our idea is to "seed" binary sentence classifiers with the acoustic frames from small data sets, and to iterate the classifier estimation on unlabelled training sentences: then, the classifier outputs become binary features of the training sentences (others have studied the automatic generation of phonetic contextual questions, not of features). As a first approach, our seed data consists of 10 k sentences labeled by speaker gender to bootstrap a Gaussian-mixture gender classifier (either "man" or "woman/child"). This is ultimately applied to the r4 337 k training sentences, to provide the "S" tags for tree growing.

The TECC or acoustic front-end of the recognizer can be based on the mel-frequency cepstral analysis of speech. A vector of 21 (or any other number of) mel-frequency cepstral coefficients (MFCC) can be computed for each frame, and mean-normalization can be applied in real-time or substantially real time. For example, to capture the speech signal dynamics, 11 consecutive vectors can be concatenated into a super-vector, and projected onto a 60 dimensional feature space. The projection combines a discriminative feature extraction known as heteroschedastic discriminant analysis (HDA), and a decorrelating linear transformation, i.e. MLLT.

The Teager-Kaiser energy estimate can be more robust than mean-squares, because it presents less prominent transient phenomena and smaller deviation errors in certain noisy conditions. Therefore the Teager energy cepstral coefficients (TECC) can replace the MFCCs in the recognizer front-end. The HDA and MLLT projections have also been estimated for the TECCs. The TECC based front-end is more accurate than the MFCCs, and the improvements from the better LM, AM and front-end can cumulatively provide much better results than any of them individually.

The 77.1% accuracy of the r4 system (4th line of FIG. 4) is the baseline for the algorithm improvements disclosed herein. The lower portion of FIG. 4 (below the 4th line) shows the accuracies for the various improvements, with the LM and AM being estimated on the same field-data as r4. To assess the relative importance of the improvements, the lower part of FIG. 4 contains lines that differ only by one system component (LM, AM or front-end). In the LM column, "SL" refers to the sentence length LM, with a 0.4% accuracy increase. In the AM column i, ii, and iii each refer to the respective decision-tree upgrades, with tags "F" and "S" for the non-contextual features. All the AMs are triphonic except when denoted by "5 ph" (pentaphones). The pentaphones improve the word accuracy by only 0.2%.

Figure 3:
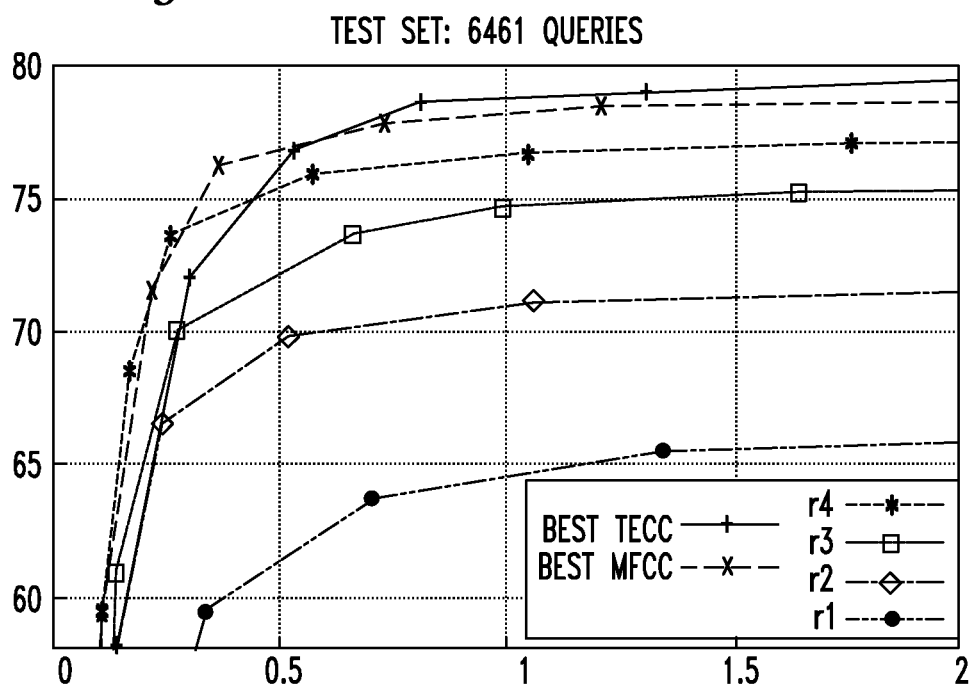
FIG. 3 illustrates example performance of different Speak4it systems.

The combination of the AM and LM improvements increase the accuracy by 1.8%, from 77.1% to 78.9%, without changing the MFCC frontend. Switching from the MFCC to the TECC frontend improves the accuracy further to 79.7%. The overall relative word error rate reduction is 11.3%. In FIG. 3, the two top curves correspond to the best TECC and MFCC systems, demonstrating that the improvements hold at real-time.

Using the Speak4it application as a real-life example, AM and LM adaptation and training on even relatively small amounts of field data can improve word recognition accuracy significantly. Experimental data shows an improvement from 66.4% to 77.1%, for a relative word error rate reduction of 32%. Combined algorithmic improvements concerning sentence-length conditioned LM, the use of non-contextual features in AM decision-trees, and acoustic front-end robustness can further improve the accuracy to 79.7%, for an additional relative error reduction of 11.3%.

Interestingly, the introduction of non-contextual features does not significantly change the AM size, but does allow for splitting the tree-nodes by other ways than phonetic context. In FIG. 4 the "S" feature yields a larger accuracy gain than "F". This correlates with the structure of the decision trees, where the questions about "S" and "F" are applied for growing 90.5% and 11% of the tree-leaves (HMM states), respectively. The operation of decision tree by training vectors can be improved by decorrelation. The system can use lexical features other than the context, or sentence level features like gender. The features (such as gender) do not require manual labeling of the training data, but can be inferred automatically from the data using classifiers.

Figure 5:
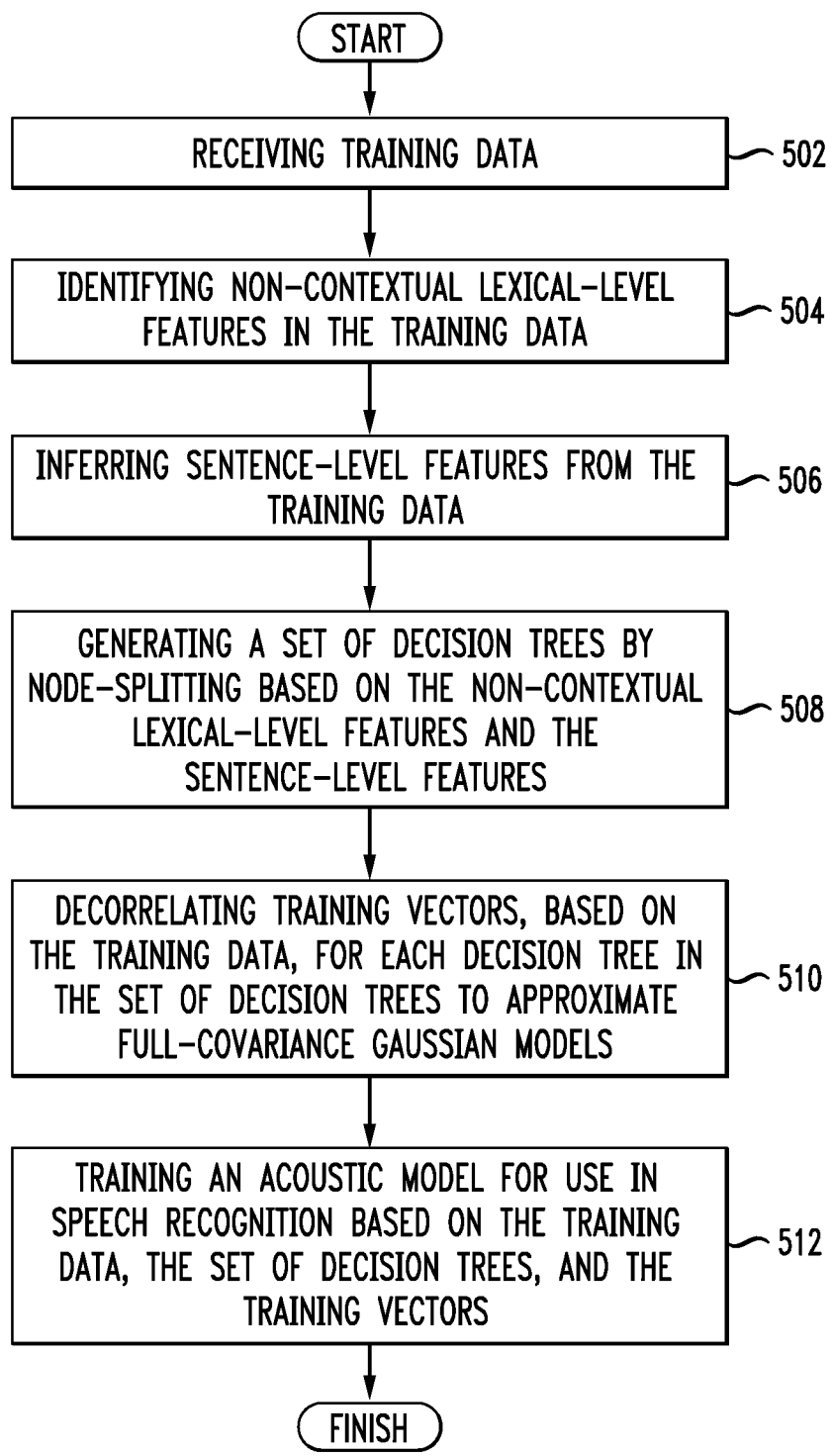
FIG. 5 illustrates an example method embodiment.

Having disclosed some basic system components, concepts, and experimental data, the disclosure now turns to the exemplary method embodiment shown in FIG. 5 for generating models for use in speech recognition. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system 100 receives training data (502). The training data can be unlabeled, labeled, or some combination thereof. Then the system 100 identifies non-contextual lexical-level features in the training data (504) and infers sentence-level features from the training data (506). A sentence classifier can infer sentence-level features from the training data, such as via a single pass, two pass, or multiple pass approach. The sentence classifier can be seeded with acoustic frames from a small data set of sentences labeled by gender, over which the sentence classifier iterates to classify unlabeled training sentences.

The system 100 generates a set of decision trees by node-splitting based on the non-contextual lexical-level features and the sentence-level features (508). The node-splitting can be based on binary questions on the phonetic context of the training data. The phonetic context can be characterized by place and manner of articulation. Example sentence-level features include gender, accent, and acoustic environment. The non-contextual lexical-level features can include word-level feature(s) and/or a syllable-level feature(s). The system 100 decorrelates training vectors, based on the training data, for each decision tree in the set of decision trees to approximate full-covariance Gaussian models (510), optionally based on diagonal covariance. Then the system 100 trains an acoustic model and/or language model for use in speech recognition based on the training data, the set of decision trees, and the training vectors (512). As stated above, the model can be a triphone acoustic model, a pentaphone acoustic model, or an acoustic model based on any other suitable number of phones for a particular level of ASR performance and accuracy.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving training data;
identifying non-contextual lexical-level features in the training data;
inferring sentence-level features from the training data using a sentence classifier seeded with portions of the training data;
estimating a first language model based on a sentence length by linearly interpolating subsets of the training data with a 3-gram language model, wherein the subsets are determined by length of sentences in the training data;
generating a set of decision trees by node-splitting according to the non-contextual lexical-level features and the sentence-level features;
decorrelating training vectors, according to the training data, for each decision tree in the set of decision trees to approximate full-covariance Gaussian models;
adapting a pre-existing acoustic model for use in speech recognition on received speech according to the training data, the set of decision trees, and the training vectors, to yield an adapted acoustic model;
combining the first language model with a second language model using interpolation weights and a frequency of carrier phrases in the training data, to yield a combined language model; and
performing the speech recognition on the received speech using the adapted acoustic model and the combined language model.

2. The method of claim 1, wherein approximating the full-covariance Gaussian models is according to diagonal covariance.

3. The method of claim 1, wherein the training data is unlabeled.

4. The method of claim 1, wherein the node-splitting is further according to binary questions on the phonetic context of the training data.

5. The method of claim 4, wherein the phonetic context is characterized by place and manner of articulation.

6. The method of claim 1, wherein the pre-existing acoustic model is one of a triphone acoustic model and a pentaphone acoustic model.

7. The method of claim 1, wherein the sentence-level features further comprise a gender and an accent of a speaker of the training data.

8. The method of claim 1, wherein the non-contextual lexical-level features comprise one of a word-level feature and a syllable-level feature.

9. The method of claim 1, wherein a sentence classifier infers sentence-level features from the training data.

10. The method of claim 9, wherein the sentence classifier infers sentence-level features via a two-pass approach.

11. A system comprising:
a processor; and
a computer-readable storage medium having instructions stored which, when executed by the processor, cause the processor performing operations comprising:
receiving training data;
identifying non-contextual lexical-level features in the training data;
inferring sentence-level features from the training data using a sentence classifier seeded with portions of the training data;
estimating a first language model based on a sentence length by linearly interpolating subsets of the training data with a 3-gram language model, wherein the subsets are determined by length of sentences in the training data;
generating a set of decision trees by node-splitting according to the non-contextual lexical-level features and the sentence-level features;
decorrelating training vectors, according to the training data, for each decision tree in the set of decision trees to approximate full-covariance Gaussian models;
adapting a pre-existing acoustic model for use in speech recognition on received speech according to the training data, the set of decision trees, and the training vectors, to yield an adapted acoustic model;
combining the first language model with a second language model using interpolation weights and a frequency of carrier phrases in the training data, to yield a combined language model; and
performing the speech recognition on the received speech using the adapted acoustic model and the combined language model.

12. The system of claim 11, wherein approximating the full-covariance Gaussian models is according to diagonal covariance.

13. The system of claim 11, wherein the training data is unlabeled.

14. The system of claim 11, wherein the node-splitting is further according to binary questions on the phonetic context of the training data.

15. The system of claim 14, wherein the phonetic context is characterized by place and manner of articulation.

16. The system of claim 11, wherein the pre-existing acoustic model is one of a triphone acoustic model and a pentaphone acoustic model.

17. A computer-readable storage device having instructions stored which, when executed by a computing device, cause the computing device to perform operations comprising:
receiving training data;
identifying non-contextual lexical-level features in the training data;
inferring sentence-level features from the training data using a sentence classifier seeded with portions of the training data;
estimating a first language model based on a sentence length by linearly interpolating subsets of the training data with a 3-gram language model, wherein the subsets are determined by length of sentences in the training data;
generating a set of decision trees by node-splitting according to the non-contextual lexical-level features and the sentence-level features;
decorrelating training vectors, according to the training data, for each decision tree in the set of decision trees to approximate full-covariance Gaussian models;
adapting a pre-existing acoustic model for use in speech recognition on received speech according to the training data, the set of decision trees, and the training vectors, to yield an adapted acoustic model;

combining the first language model with a second language model using interpolation weights and a frequency of carrier phrases in the training data, to yield a combined language model; and performing the speech recognition on the received speech using the adapted acoustic model and the combined language model.

18. The computer-readable storage device of claim 17, wherein the sentence-level features further comprise a gender and an accent of a speaker of the training data.

19. The computer-readable storage device of claim 17, wherein the non-contextual lexical-level features comprise one of a word-level feature and a syllable-level feature.

* * * * *